(12) United States Patent
Desai et al.

(10) Patent No.: US 10,713,218 B2
(45) Date of Patent: Jul. 14, 2020

(54) SYSTEM AND METHOD TO OPTIMALLY APPLY LOCAL RETENTION IN A REMOTE REPOSITORY

(71) Applicant: International Business Machines Corporation, Armonk, NY (US)

(72) Inventors: Rajesh M. Desai, San Jose, CA (US); Aidon P. Jennery, El Sobrante, CA (US); Lijing E. Lin, Irvine, CA (US); Roger C. Raphael, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 15/704,772

(22) Filed: Sep. 14, 2017

(65) Prior Publication Data

US 2019/0079945 A1 Mar. 14, 2019

(51) Int. Cl.
*G06F 16/00* (2019.01)
*G06F 16/14* (2019.01)
(Continued)

(52) U.S. Cl.
CPC ........ *G06F 16/152* (2019.01); *G06F 11/1469* (2013.01); *G06F 16/93* (2019.01);
(Continued)

(58) Field of Classification Search
CPC .... G06F 16/152; G06F 16/93; G06F 11/1469; G06F 2201/80; G06F 2201/805; G06F 2201/82; G06Q 50/18
(Continued)

(56) References Cited

U.S. PATENT DOCUMENTS

| 5,088,262 A * | 2/1992 | Miller | F27D 1/144 |
| | | | 110/336 |
| 8,204,869 B2 * | 6/2012 | Paknad | G06Q 10/10 |
| | | | 707/694 |

(Continued)

OTHER PUBLICATIONS

Michael R. Arkfeld; "Proliferation of "Electronically Stored Information" (ESI) and Reimbursable Private Cloud Computing Costs"; www.Lexisnexis.com; Jul. 2011; 20 pages.*
(Continued)

*Primary Examiner* — Monica M Pyo
(74) *Attorney, Agent, or Firm* — Robert C. Bunker

(57) ABSTRACT

An electronic-discovery system and method, wherein content items and hold anchors are stored in a repository, tracking objects and representational anchor objects are stored in a database system, and the tracking objects represent the content items and the representational anchor objects represent the hold anchors. A first hold anchor is used for placing a hold on the content items for a first defined period of time, and a first representational anchor object and one or more of the tracking objects are used for representing and tracking the holds for the first defined period of time. When the first defined period of time expires, a second hold anchor is used for placing the hold on the content items for a second defined period of time, and a second representational anchor object and the tracking objects are used for representing and tracking the holds for the second defined period of time.

8 Claims, 6 Drawing Sheets

(51) Int. Cl.
*G06Q 50/18* (2012.01)
*G06F 11/14* (2006.01)
*G06F 16/93* (2019.01)

(52) U.S. Cl.
CPC ......... *G06Q 50/18* (2013.01); *G06F 2201/80* (2013.01); *G06F 2201/805* (2013.01); *G06F 2201/82* (2013.01)

(58) Field of Classification Search
USPC ........................................................ 707/662
See application file for complete search history.

(56) References Cited

U.S. PATENT DOCUMENTS

| | | | |
|---|---|---|---|
| 8,234,442 B2 | 7/2012 | Khosrowpour et al. | |
| 8,327,384 B2 * | 12/2012 | Paknad .................. | G06Q 10/10 719/318 |
| 8,745,008 B2 | 6/2014 | Kisin et al. | |
| 2009/0150168 A1 * | 6/2009 | Schmidt ................ | G06Q 10/10 705/311 |
| 2009/0150866 A1 * | 6/2009 | Schmidt ................ | G06Q 50/18 717/120 |
| 2010/0050231 A1 | 2/2010 | Kilday et al. | |
| 2015/0100550 A1 * | 4/2015 | Desai ...................... | G06F 16/13 707/638 |
| 2016/0316018 A1 * | 10/2016 | Mehta .................. | H04L 67/1095 |
| 2019/0278747 A1 | 9/2019 | Desai | |

OTHER PUBLICATIONS

IBM: List of IBM Patents or Patent Applications Treated as Related (Appendix P), Jan. 6, 2020, pp. 1-2.

* cited by examiner

SYSTEM AND METHOD TO OPTIMALLY APPLY LOCAL RETENTION IN A REMOTE REPOSITORY

BACKGROUND

Electronic discovery (e-discovery) is a procedure by which parties in a legal matter preserve, collect, review, and exchange electronically stored information (ESI). There are many different types of ESI that may be sought in e-discovery, such as email and word processing documents, as well as databases and other data stores.

Typically, the e-discovery process is set in motion as soon as litigation is reasonably foreseeable, which triggers the legal duty to preserve potentially relevant ESI. Attorneys from both sides determine the scope of e-discovery, identify and preserve the relevant ESI, and make e-discovery requests and challenges.

After relevant ESI is identified, it needs to be protected from "spoliation," i.e., any destruction or alteration of evidence. While there are different ways to preserve ESI, the most common is through a legal hold process. A legal hold is a formal communication sent to relevant custodians instructing them not to delete ESI (or paper documents) that may be relevant to the legal matter.

One common preservation method is a collect-to-preserve approach that collects relevant data by copying it from a data source to a repository. The collect-to-preserve approach is often recommended for highly relevant ESI or ESI at a high risk of deletion.

Another preservation method is a preserve-in-place approach that maintains ESI at the data source. A preservation application either inhibits any attempts by custodians to delete ESI or maintains backup copies of ESI at the repository to prevent any loss of data.

In many ways, preservation may be the most difficult portion of the e-discovery process. It involves taking steps to ensure that potentially relevant data is not destroyed or altered during the pendency of the legal matter. Preservation failures can result in a variety of sanctions.

Thus, there is a need in the art for improvements in e-discovery systems, for example, recovery from failures, as well as optimization of holds and releases. The present invention satisfies this need.

SUMMARY

The invention provided herein has a number of embodiments useful, for example, in e-discovery systems and methods that perform the following: storing one or more content items and one or more hold anchors in a repository; storing one or more tracking objects and one or more representational anchor objects in a database system, wherein each of the tracking objects represents one of the content items and each of the representational anchor objects represents one of the hold anchors; using a first one of the hold anchors for placing one or more holds on one or more of the content items in the repository for a first defined period of time, and representing and tracking the holds using a first one of the representational anchor objects and one or more of the tracking objects in the database system for the first defined period of time; and when the first defined period of time expires, using a second one of the hold anchors for placing the holds on the one or more of the content items in the repository system for a second defined period of time, and representing and tracking the holds using a second one of the representational anchor objects and the one or more of the tracking objects in the database system for the second defined period of time. The using steps may be repeated.

Each of the holds are placed only through the first or second one of the hold anchors and represented by the first or second one of the representational anchor objects. Moreover, the holds for the first defined period of time are related to the first one of the hold anchors and represented by the first one of the representational anchor objects, and the holds for the second defined period of time are related to the second one of the hold anchors and represented by the second one of the representational anchor objects. Whenever one of the content items is placed on one of the holds, a timestamp of the first or second one of the hold anchors and the first or second one of the representational anchor objects is updated.

The systems and methods can recover from a failure of the repository or database system by first restoring the repository, the database system, or the repository and the database system, such that the repository's state is ahead, in time, of the database system's state. Thereafter, the following functions or steps are performed: (1) in the database system, locating one of the representational anchor objects with a latest start time; (2) in the repository, finding the hold anchors that have a timestamp later than the latest start time; (3) in the repository, finding the content items that have been placed on one of the holds for the hold anchors found in step (2); (4) in the database system, finding the tracking objects that represent the content items found in step (3); (5) in the database system, performing a fixup on the representational anchor objects for the tracking objects found in step (4), if the tracking objects are associated with a different one of the representational anchor objects, wherein the fixup is applied so that the representational anchor objects on the database system agree with the hold anchors on the repository; (6) in the database system, adding the tracking objects found in step (4) to a set B, if the tracking objects represent the content items that have been placed on one of the holds; (7) in the repository, releasing or tracking the content items that have been placed on one of the holds, for the tracking objects found in step (4), if the tracking objects and the representational anchor objects indicate that the content items are not on one of the holds; (8) in the repository, optionally removing the hold anchors that do not have corresponding representational anchor objects in the database system; (9) in the database system, finding the tracking objects that represent the content items that have been placed on one of the holds due to any of the hold anchors found in step (2) and then adding the tracking objects to a set A; (10) in the database system, determining the tracking objects in a set C, wherein the set C=set A−set B; and (11) in the repository, placing one of the holds on the content items represented by the tracking objects in the set C. Only the content items placed on one of the holds or released from one of the holds after the latest start time are considered.

BRIEF DESCRIPTION OF THE DRAWINGS

Referring now to the drawings in which like reference numbers represent corresponding parts throughout.

DETAILED DESCRIPTION

Figure 1:
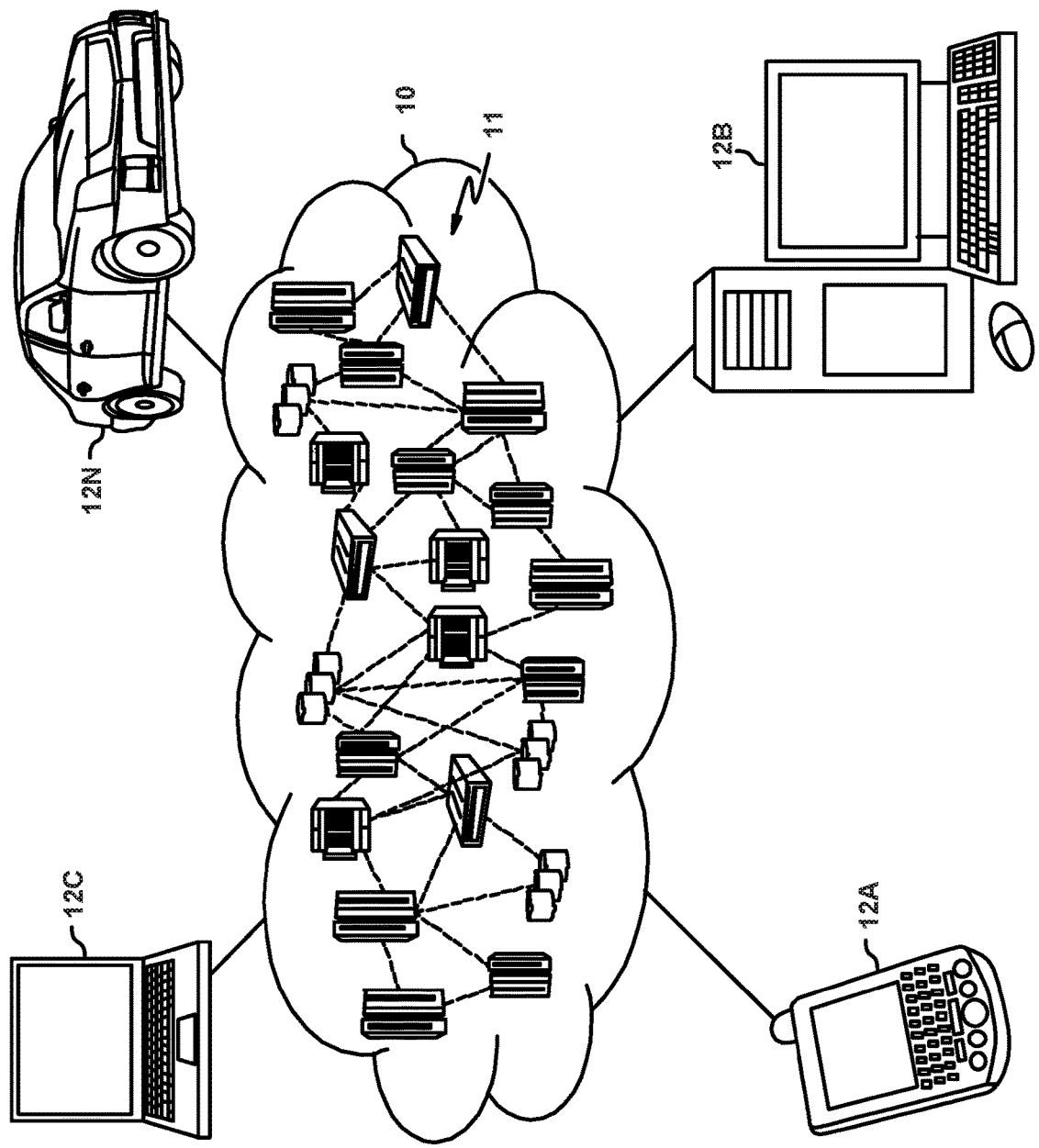
FIG. 1 depicts a cloud computing environment according to an embodiment of the present invention.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

In a distributed computing environment implementing e-discovery including preservation/retention management, where the systems involved are truly disparate and there is no single encompassing transaction and recovery domain, providing a mechanism for cohesive and consistent recovery between the systems involved can be difficult, and a recovery fix up process itself can take a significant amount of time given that it can span a very large set of items to reconcile. The general issue is that when systems restart after some kind of failure or set of failures, synchronization is required before further processing can continue, and the time it takes to synchronize between systems is roughly dependent on the related items across the multiple systems using an exhaustive approach. What is required is a more optimal design where preservation/retention state changes for items are time-bound in some way to reduce the cost to apply the preservation/retention as well as any required resynchronization work when recovery is called for under conditions of crashes and disaster recovery scenarios.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 10 is depicted. As shown, cloud computing environment 10 includes one or more cloud computing nodes 11 with which local computing devices used by cloud consumers, such as, for example, personal digital assistant (PDA) or cellular telephone 12A, desktop computer 12B, laptop computer 12C, and/or automobile computer system 12N may communicate. Nodes 11 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 12A-N shown in FIG. 1 are intended to be illustrative only and that computing nodes 11 and cloud computing environment 10 can communicate with any type of computerized device over any type of network and/or network addressable connection (e.g., using a web browser).

Figure 2:
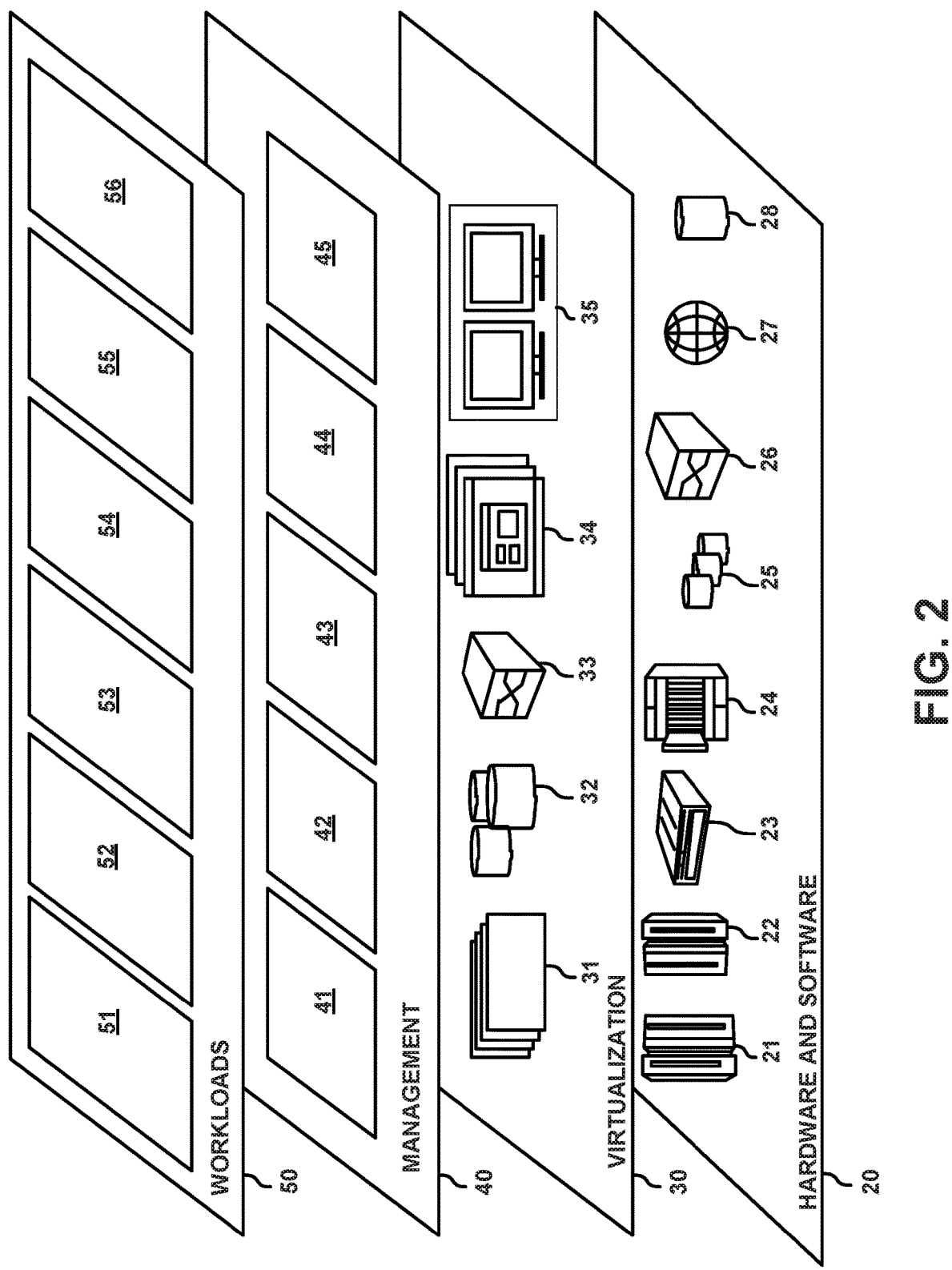
FIG. 2 depicts abstraction model layers according to an embodiment of the present invention.

Referring now to FIG. 2, a set of functional abstraction layers provided by cloud computing environment 10 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 20 includes hardware and software components. Examples of hardware components include: one or more computers such as mainframes 21, RISC (Reduced Instruction Set Computer) architecture based servers 22, servers 23, and blade servers 24; storage devices 25; and networks and networking components 26. In some embodiments, software components include network application server software 27 and database software 28.

Virtualization layer 30 provides an abstraction layer from which the following examples of virtual entities may be provided: virtual servers 31; virtual storage 32; virtual networks 33, including virtual private networks; virtual applications and operating systems 34; and virtual clients 35.

In one example, management layer 40 may provide the functions described below. Resource provisioning 41 provides dynamic procurement of computing resources and other resources that are utilized to perform tasks within the cloud computing environment 10. Metering and pricing 42 provide cost tracking as resources are utilized within the cloud computing environment 10, and billing or invoicing for consumption of these resources. In one example, these resources may include application software licenses. Security provides identity verification for cloud consumers and tasks, as well as protection for data and other resources. User portal 43 provides access to the cloud computing environment 10 for consumers and system administrators. Service level management 44, which includes containers, provides cloud computing resource allocation and management such that required service levels are met. Service Level Agreement (SLA) planning and fulfillment 45 provide pre-arrangement for, and procurement of, cloud computing resources for which a future requirement is anticipated in accordance with an SLA.

Workloads layer 50 provides examples of functionality for which the cloud computing environment 10 may be utilized. Examples of workloads, tasks and functions which may be provided from this layer include: e-discovery processing 51; transaction processing 52; mapping and navigation 53; software development and lifecycle management 54; virtual classroom education delivery 55; etc.

Distributed Computing Environment

The cloud computing environment 10 of FIGS. 1 and 2 may be used to implement a distributed computing environment. One example of a distributed computing environment comprises the e-discovery processing 51 across one or more nodes 11.

Figure 3:
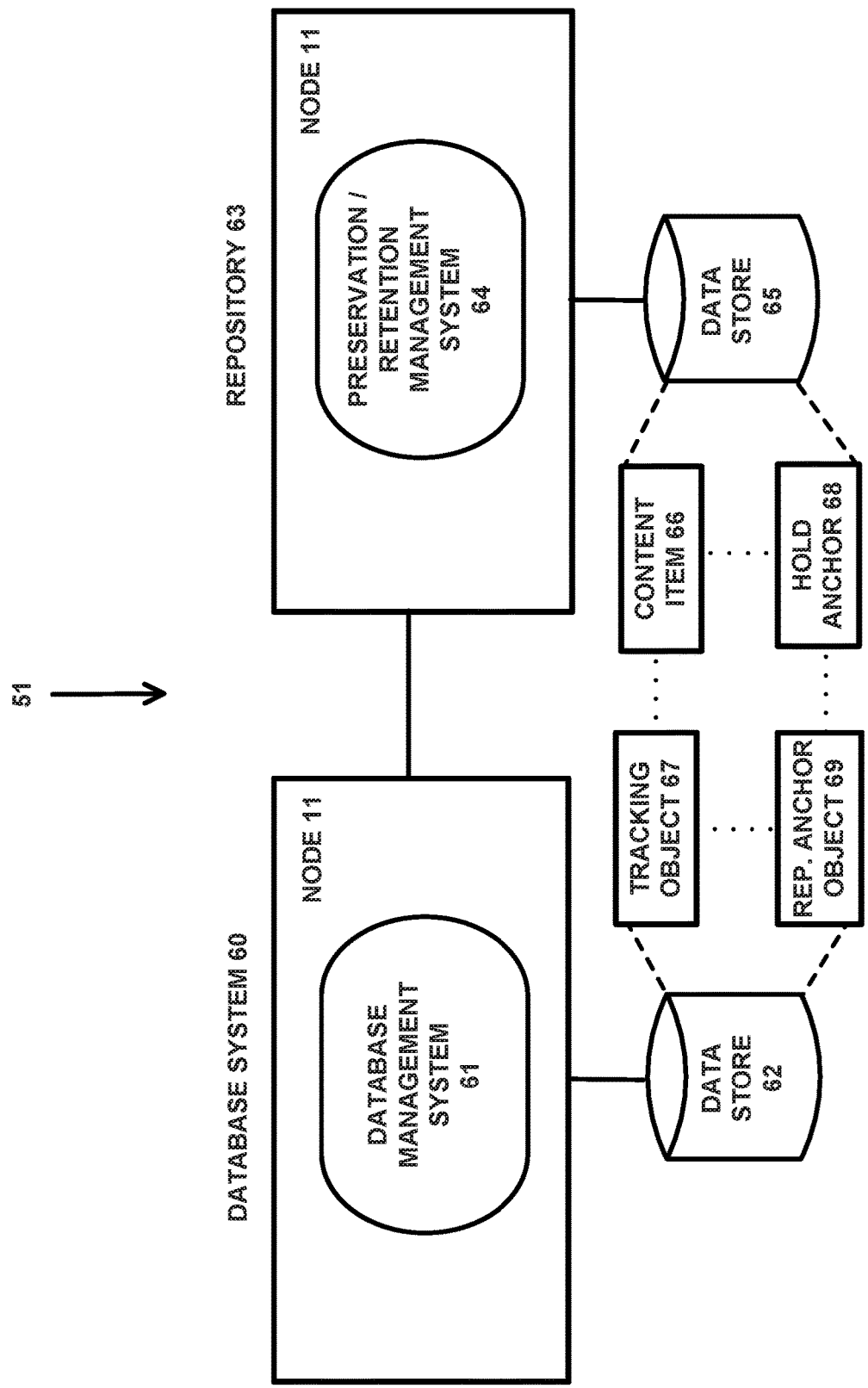
FIG. 3 illustrates a distributed computing environment according to an embodiment of the present invention.

FIG. 3 illustrates a distributed computing environment used for the e-discovery processing 51, according to one embodiment. The distributed computing environment used for the e-discovery processing 51 is comprised of the following systems and components:

at least one database (DB) system 60, which is one or more nodes 11 that execute one or more database management systems (DBMS) 61 to manage and control one or more data stores 62; and at least one repository 63, which is one or more nodes 11 that execute one or more preservation/retention management systems (PRMS) 64 to manage and control one or more data stores 65.

Although the present invention is described herein as being implemented on the database system 60 and repository 63, it could be implemented on other nodes 11 as well.

The repository 63 is a system for storing data (often called content) and information about that data (often called metadata). The repository 63 is where an enterprise will store documents, spreadsheets, emails, videos and many other types of content. The content and its metadata can be considered a content item 66, wherein one or more content items are stored in the repository 63.

The DB system 60 stores one or more tracking objects 67 for the content items 66 stored in the repository 63. Typically, there will be a tracking object 67 in the DB system 60 that represents each content item 66 in the repository 63.

The repository 63 also stores one or more hold anchors 68. When a content item 66 is placed on hold in the repository 63, the hold is defined by a relationship between the content item 66 and an associated hold anchor 68.

For each hold anchor 68 in the repository 63, there is a representational (rep.) anchor object 69 in the DB system 60 that represents the hold anchor 68. Likewise, the hold relationship between the content item 66 and its associated hold anchor 68 in the repository 63 is reflected by a relationship between the tracking object 67 and an associated representational anchor object 69 in the DB system 60.

Hold Processing

The utility and performance of the repository 63 and PRMS 64 can be enhanced by using the DB system 60 and DBMS 61 in conjunction with the repository 63 and PRMS 64. However, as there are now two systems 60, 63 involved, presumably with different transactional models, a different approach is required for failure handling. For the sake of simplicity, a single one of each DB system 60 and repository 63 is considered herein; however, this invention is easily extended over multiple ones of the DB system 60 and repository 63, where each are independent transaction and recovery domains.

When a content item 66 is required to be put on hold, that operation is spread across the two systems 60, 63, and is therefore not atomic. First, the DB system 60 will do some setup work, then the hold will be applied to the content item 66 by the repository 63 using the hold anchor 68, and then the hold will be recorded for the tracking object 67 by the DB system 60 using the representational anchor object 69.

The DB system 60 provides some unique approaches to enhance the preservation/retention capabilities of the repository 63, and these approaches are key to enabling recovery. The DB system 60 has a tracking mechanism, so that every content item 66 in the repository 63, whether preserved/retained or not, will be represented by a tracking object 67 in the DB system 60. In addition, the DB system 60 will track preservation/retention holds for the content items 66 defined by the hold anchors 68 using the corresponding representational anchor objects 69 for the corresponding tracking objects 67. This enables the repository 63 to be invoked only when the first preservation/retention hold is placed on a content item 66, and when the last preservation/retention hold is removed from the content item 66. The DB system 60 provides its own internal counting mechanism for how many times preservation/retention holds have been placed/removed for each content item 66, and allows for there to only ever be zero or one preservation/retention holds on the content item 66 (and this is one of the important aspects that allows for speedy recovery.) The DB system 60 can also provide many different ways of controlling, grouping and/or managing preservation/retention holds that may not be available in the repository 63 itself.

The capability of the DB system 60 in counting and tracking of the number of preservation/retention holds applicable to a content item 66 allows the DB system 60 to affect a preservation/retention system of significantly increased performance than using the capabilities of the repository 63 alone. It also allows the DB system 60 to provide a time-based retention system for the repository 63, even though the repository 63 may only support simple preservation holds. The DB system 60 records and operates on retention durations for the different types of classifications for the content items 66, and when the longest duration has expired, the DB system 60 removes the hold from the content item 66 in the repository 63. Optionally, the DB system 60 could also delete that content item 66 from the repository 63.

When a fatal error occurs, it may be necessary to restore one or both of the systems 60, 63 from a backup. However, there is a strong possibility that, after the restore, the two systems 60, 63 and their data stores 62, 65 are not synchronized. In order to address this, synchronized backups could be one solution, but they are almost impossible to coordinate exactly, and there can still be synchronization issues due to the distributed, non-atomic operations. Consequently, a mechanism is required to synchronize the two systems 60, 63 after a failure and a restore.

In one embodiment, it is assumed that when a backup of the repository 63 is restored (i.e., a backup of the data store 65 is restored), an earlier backup of the DB system 60 is also restored (i.e., a backup of the data store 62 is restored), so that the DB system 60 and its data store 62 are "at an earlier point in time" than the repository 63 and its data store 65. The synchronization that is then required is to "pull back" the repository 63, so that the repository 63 is in synchronization with the DB system 60 with respect to preservation/retention holds, at the time of the restore of the DB system. With potentially many content items 66 on hold, this could take a very long time with exhaustive A vs. B differentials between the systems 60, 63, and will not meet common standards for up-time and restoration of service.

In one embodiment, the hold anchors 68 are time-boxed, wherein a time-box is a defined period of time during which the hold associated with the hold anchor 68 must be accomplished. With time-boxed hold anchors 68, the problem is made more manageable.

The steps involve using a first one of the hold anchors 68 for placing one or more holds on one or more of the content items 66 in the repository 63 for a first defined period of time, and representing and tracking the holds using a first one of the representational anchor objects 69 and one or more of the tracking objects 67 in the DB system 60 for the first defined period of time. When the first defined period of time expires, the steps involve using a second one of the hold anchors 68 for placing the holds on the one or more of the content items 66 in the repository system 63 for a second defined period of time, and representing and tracking the holds using a second one of the representational anchor objects 69 and the one or more of the tracking objects 67 in the DB system 60 for the second defined period of time. These steps may be repeated.

Each of the holds are placed only through the first or second one of the hold anchors 68 and the first or second one of the representational anchor objects 69. As a result, the holds for the first defined period of time are related to the first one of the hold anchors 68 and represented by the first one of the representational anchor objects 69, and the holds for the second defined period of time are related to the second one of the hold anchors 68 and represented by the second one of the representational anchor objects 69. Whenever one of the content items 66 is placed on one of the holds, a timestamp of the first or second one of the hold anchors 68 and the first or second one of the representational anchor objects 69 is updated. Thus, it is assumed that the hold anchors 68 and representational anchor objects 69, including their start and end times, are currently synchronized between the repository 63 and the DB system 60, and can be used for recovery after a failure of the DB system 60 and/or repository 63.

Flowcharts

Figure 4:
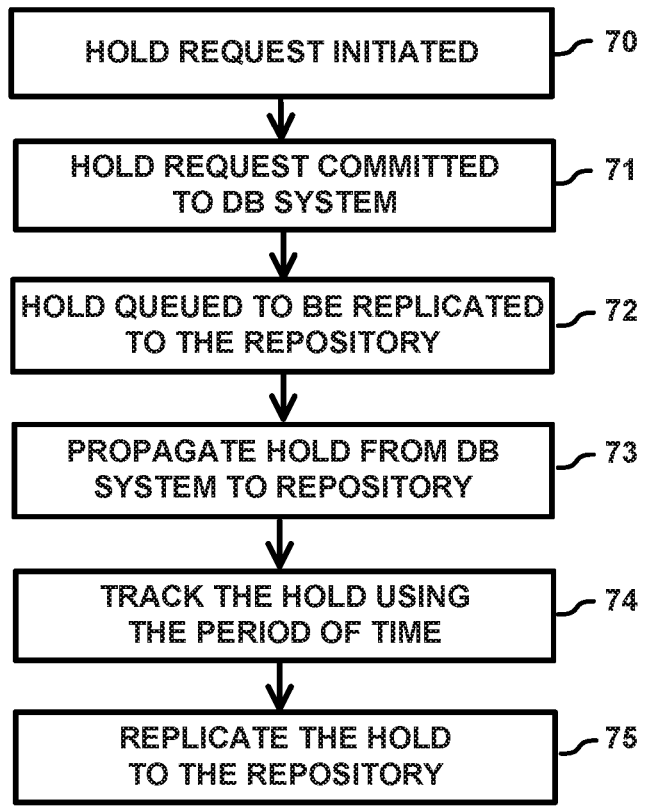
FIGS. 4, 5 and 6 are flowcharts illustrating the processing steps that are performed according to an embodiment of the present invention.

FIG. 4 is a flowchart that illustrates the actions performed when a hold is requested:

Block 70 represents a hold request being initiated for a content item 66 using the hold anchor 68.

Block 71 represents the hold request being committed to the DB system 60, as a representational anchor object 69 for the tracking object 67.

Block 72 represents the hold being queued to be replicated to the repository 63, wherein a single logical queue manages all holds and releases of holds, with holds taking priority over releases of holds.

Block 73 represents the hold being propagated from the DB system 60 to the repository 63, wherein a single request is propagated at a time.

Block 74 represents the hold being tracked using a (first) defined period of time, such that, when the defined period of time expires, a new (second) defined period of time is initiated and used to track the hold by the hold anchor 68 on the content item 66.

Block 75 represents the hold being replicated to the repository 63, so that the hold anchor 68 for the content item 66 on the repository 63 mirrors the representational anchor object 69 for the tracking object 67 on the DB system 60.

Figure 5:
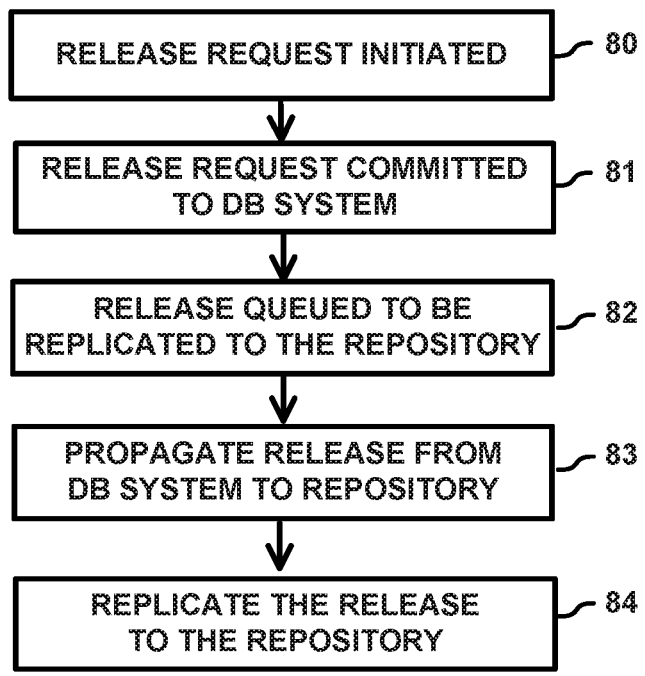

FIG. 5 is a flowchart that illustrates the actions performed when a release is requested:

Block 80 represents a release request being initiated for a content item 66 that is on hold using the hold anchor 68.

Block 81 represents the release request being committed to the DB system 60, to remove the hold by the representational anchor object 69 on the tracking object 67.

Block 82 represents the release request being queued to be replicated to the repository 63, wherein a single logical queue manages all holds and releases of holds, with holds taking priority over releases of holds.

Block 83 represents the release being propagated from the DB system 60 to the repository 63, wherein a single request is propagated at a time.

Block 84 represents the release being replicated to the repository 63, so that the hold anchor 68 for the content item 66 on the repository 63 mirrors the representational anchor object 69 for the tracking object 67 on the DB system 60.

Figure 6:
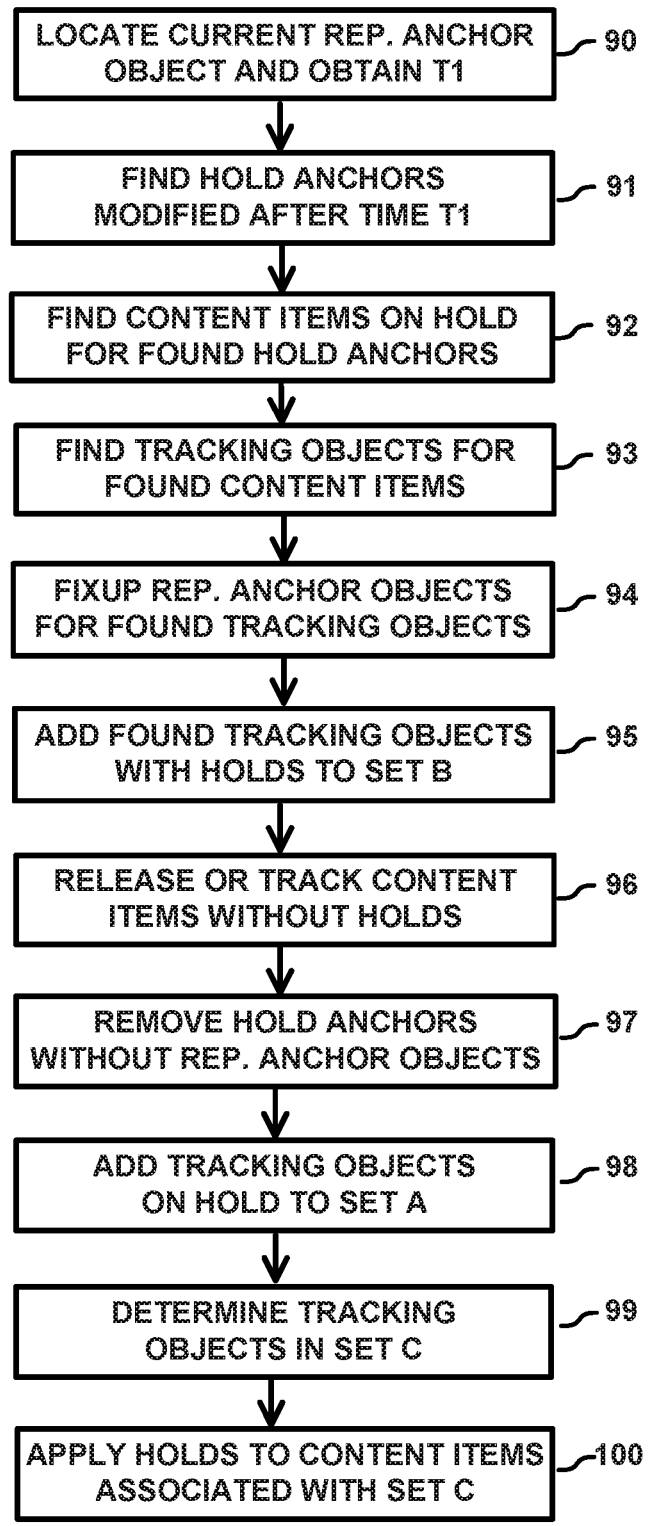

FIG. 6 is a flowchart that illustrates the actions performed after a restore of the DB system 60, the repository 63, or both the DB system 60 and repository 63, such that the repository's 63 state is ahead, in time, of the DB system's 60 state (and assuming both systems 60, 63 are operational, but in a quiesced and unusable state until recovery has been completed):

Block 90 represents, in the DB system 60, locating one of the representational anchor objects 69 (this is the representational anchor object 69 that would have been active at the time of the backup) with a latest start time t1.

Block 91 represents, in the repository 63, finding all the hold anchors 68 that have a timestamp later than the latest start time t1 (this will provide all hold anchors 68 that have participated in hold or release operations after t1).

Block 92 represents, in the repository 63, finding all the content items 66 that have been placed on hold for all the hold anchors 68 found in Block 91.

Block 93 represents, in the DB system 60, finding all the tracking objects 67 that represent the content items 66 found in Block 92.

Block 904 represents, in the DB system 60, performing a fixup on the representational anchor objects 69 for the tracking objects 67 found in Block 93, if the tracking objects 67 are associated with a different representational anchor object 69, wherein the fixup is applied so that the representational anchor objects 69 on the DB system 60 agree with the hold anchors 68 on the repository 63.

Block 95 represents, in the DB system 60, adding the tracking objects 67 found in Block 93 to set B, if the tracking objects 67 represent the content items 66 that have been placed on hold (regardless of whether there is agreement between the hold anchor 68 and representational anchor object 69).

Block 96 represents, in the repository 63, releasing or tracking the content items 66 that have been placed on hold, for the tracking objects 67 found in Block 73, if the tracking objects 67 and representational anchor objects 69 indicate that the content items 66 are not on hold.

Block 97 represents, in the repository 63, optionally removing the hold anchors 68 that do not have corresponding representational anchor objects 69 in the DB system 60.

Block 98 represents, in the DB system 60, finding all the tracking objects 67 that represent the content items 66 that have been placed on hold due to any of the hold anchors 68 found in Block 91 and then adding the found tracking objects 67 to set A.

Block 99 represents, in the DB system 60, determining the tracking objects 67 in set C, wherein set C=set A−set B.

Block 100 represents, in the repository 63, placing holds on the content items 66 represented by the tracking objects 67 in set C (using the current hold anchor 68).

In this manner, rather than performing a full differential between the DB system 60 and the repository 63 to locate content items 66, tracking objects 67, hold anchors 68 and representational anchor objects 69, that disagree in their hold/release states, only those content items 66, tracking objects 67, hold anchors 68 and representational anchor objects 69, that participated in hold/release operations after the current representational anchor object 69 started being used at the latest start time t1 need be considered, and a more efficient recovery can be performed.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   one or more computers programmed for:
   storing one or more content items and one or more hold anchors in at least one repository;
   storing one or more tracking objects and one or more representational anchor objects in at least one database system, wherein each of the tracking objects represents one of the content items and each of the representational anchor objects represents one of the hold anchors;
   using a first one of the hold anchors for placing one or more holds on one or more of the content items in the repository for a first defined period of time, and representing and tracking the holds using a first one of the representational anchor objects and one or more of the tracking objects in the database system for the first defined period of time;
   when the first defined period of time expires, using a second one of the hold anchors for placing the holds on the one or more of the content items in the repository system for a second defined period of time, and representing and tracking the holds using a second one of the representational anchor objects and the one or more of the tracking objects in the database system for the second defined period of time;
   wherein each of the holds are placed only through the first or second one of the hold anchors and represented by the first or second one of the representational anchor objects; and
   recovering from a failure of the repository or database system by performing the steps of:
   (1) in the database system, locating one of the representational anchor objects with a latest start time;
   (2) in the repository, finding the hold anchors that have a timestamp later than the latest start time;
   (3) in the repository, finding the content items that have been placed on one of the holds for the hold anchors found in step (2);
   (4) in the database system finding the tracking objects that represent the content items found in step (3);
   (5) in the database system, performing a fixup on the representational anchor objects for the tracking objects found in step (4), if the tracking objects are associated with a different one of the representational anchor objects, wherein the fixup is applied so that the representational anchor objects on the database system agree with the hold anchors on the repository;

(6) in the database system, adding the tracking objects found in step (4) to a set B, if the tracking objects represent the content items that have been placed on one of the holds;

(7) in the repository, releasing or tracking the content items that have been placed on one of the holds, for the tracking objects found in step (4), if the tracking objects and the representational anchor objects indicate that the content items are not on one of the holds;

(8) in the repository, optionally removing the hold anchors that do not have corresponding representational anchor objects in the database system;

(9) in the database system, finding the tracking objects that represent the content items that have been placed on one of the holds due to any of the hold anchors found in step (2) and then adding the tracking objects to a set A; and

(10) in the database system, determining the tracking objects in a set C, wherein the set C=set A−set B; and

(11) in the repository, placing one of the holds on the content items represented by the tracking objects in the set C.

2. The system of claim 1, wherein the using steps are repeated.

3. The system of claim 1, wherein the holds for the first defined period of time are related to the first one of the hold anchors and represented by the first one of the representational anchor objects, and the holds for the second defined period of time are related to the second one of the hold anchors and represented by the second one of the representational anchor objects.

4. The system of claim 1, wherein, whenever one of the content items is placed on one of the holds, a timestamp of the first or second one of the hold anchors and the first or second one of the representational anchor objects is updated.

5. The system of claim 1, wherein recovering from a failure of the repository or database system further comprises restoring: (1) the repository, (2) the database system, or (3) both the repository and the database system, such that the repository's state is ahead, in time, of the database system's state.

6. The system of claim 1, wherein only the content items placed on one of the holds after the latest start time are considered.

7. The system of claim 1, wherein only the content items released from one of the holds after the latest start time are considered.

8. A computer program product, the computer program product comprising a computer readable storage medium having program instructions embodied therewith, the program instructions executable by one or more computers to cause the computers to perform a method comprising:

storing one or more content items and one or more hold anchors in at least one repository;

storing one or more tracking objects and one or more representational anchor objects in at least one database system, wherein each of the tracking objects represents one of the content items and each of the representational anchor objects represents one of the hold anchors;

using a first one of the hold anchors for placing one or more holds on one or more of the content items in the repository for a first defined period of time, and representing and tracking the holds using a first one of the representational anchor objects and one or more of the tracking objects in the database system for the first defined period of time;

when the first defined period of time expires, using a second one of the hold anchors for placing the holds on the one or more of the content items in the repository system for a second defined period of time, and representing and tracking the holds using a second one of the representational anchor objects and the one or more of the tracking objects in the database system for the second defined period of time;

wherein each of the holds are placed only through the first or second one of the hold anchors and represented by the first or second one of the representational anchor objects; and recovering from a failure of the repository or database system by performing the steps of:

(1) in the database system, locating one of the representational anchor objects with a latest start time;

(2) in the repository, finding the hold anchors that have a timestamp later than the latest start time;

(3) in the repository, finding the content items that have been placed on one of the holds for the hold anchors found in step (2);

(4) in the database system finding the tracking objects that represent the content items found in step (3);

(5) in the database system, performing a fixup on the representational anchor objects for the tracking objects found in step (4), if the tracking objects are associated with a different one of the representational anchor objects, wherein the fixup is applied so that the representational anchor objects on the database system agree with the hold anchors on the repository;

(6) in the database system, adding the tracking objects found in step (4) to a set B, if the tracking objects represent the content items that have been placed on one of the holds;

(7) in the repository, releasing or tracking the content items that have been placed on one of the holds, for the tracking objects found in step (4), if the tracking objects and the representational anchor objects indicate that the content items are not on one of the holds;

(8) in the repository, optionally removing the hold anchors that do not have corresponding representational anchor objects in the database system;

(9) in the database system, finding the tracking objects that represent the content items that have been placed on one of the holds due to any of the hold anchors found in step (2) and then adding the tracking objects to a set A; and

(10) in the database system, determining the tracking objects in a set C, wherein the set C=set A−set B; and

(11) in the repository, placing one of the holds on the content items represented by the tracking objects in the set C.

* * * * *